US012069042B2

(12) United States Patent
Verma et al.

(10) Patent No.: US 12,069,042 B2
(45) Date of Patent: Aug. 20, 2024

(54) RESOURCE UNIT ISOLATION FOR INCREASED SAFETY AND SECURITY IN CLOUD SERVICES

(71) Applicant: MICROSOFT TECHNOLOGY LICENSING, LLC, Redmond, WA (US)

(72) Inventors: Nidhi Verma, Redmond, WA (US); Roberta Cannerozzi, Bellevue, WA (US); Brian Gregory O'Connor, Kenmore, WA (US); Darius Snapkauskas, Sammamish, WA (US); Le Chang, Redmond, WA (US); Harpreet Singh Miglani, Redmond, WA (US); Phillip Isaac Beish, Duvall, WA (US); Dylan Thomas Nunley, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 315 days.

(21) Appl. No.: 17/520,549

(22) Filed: Nov. 5, 2021

(65) Prior Publication Data
US 2023/0146669 A1 May 11, 2023

(51) Int. Cl.
*H04L 9/40* (2022.01)
*G06F 9/50* (2006.01)

(52) U.S. Cl.
CPC ........ *H04L 63/0823* (2013.01); *G06F 9/5038* (2013.01); *H04L 63/0876* (2013.01); *H04L 63/108* (2013.01); *H04L 63/20* (2013.01)

(58) Field of Classification Search
CPC ............. H04L 63/0823; H04L 63/0876; H04L 63/0108; H04L 63/20; G06F 9/5038
See application file for complete search history.

(56) References Cited

U.S. PATENT DOCUMENTS

| 2005/0117587 A1* | 6/2005 | Kawato | H04L 47/724 370/395.21 |
| 2016/0099969 A1* | 4/2016 | Angus | H04L 63/20 713/158 |

OTHER PUBLICATIONS

"MakeCert", Retrieved from: https://docs.microsoft.com/en-US/windows/win32/seccrypto/makecert?redirectedfrom=MSDN, May 31, 2018, 8 Pages.

(Continued)

*Primary Examiner* — Nicholas P Celani
(74) *Attorney, Agent, or Firm* — Newport IP, LLC; Jacob P. Rohwer

(57) ABSTRACT

The techniques disclosed herein enable improved security as well as more scalable and reliable job execution by utilizing granular security boundaries and certificate-based authentication for all communication within cloud-based platforms. To manage a cloud-based platform, a system receives a plurality of jobs and associated certificates at a first security boundary that are to be executed at various resource units within a second security boundary. The system then authenticates each certificate before transmitting each job to its respective resource unit for execution. In addition, the system is further configured to monitor active certificates for compromise and accordingly isolate various security boundaries in the event of a security breach. By isolating portions of the cloud-based platform within security boundaries, the system can mitigate the impact of security breaches. Furthermore, certificate-based authentication addresses performance constraints to enable more efficient and scalable job execution.

20 Claims, 10 Drawing Sheets

(56) References Cited

OTHER PUBLICATIONS

Andrews, Elizabeth, "Configure IIS to use your self signed certificates with your application including IIS client certificate mapping authentication", Retrieved from: https://blog.jayway.com/2014/10/27/configure-iis-to-use-your-self-signed-certificates-with-your-application/, Oct. 27, 2014, 73 Pages.

Andrews, Elizabeth, "Creating self signed certificates with makecert.exe for development", Retrieved from: https://blog.jayway.com/2014/09/03/creating-self-signed-certificates-with-makecert-exe-for-development/, Sep. 3, 2014, 67 Pages.

* cited by examiner

RESOURCE UNIT ISOLATION FOR INCREASED SAFETY AND SECURITY IN CLOUD SERVICES

BACKGROUND

As cloud computing gains popularity, more and more data and/or services are stored and/or provided online via network connections. Providing an optimal and reliable user experience is an important aspect for cloud-based platforms that offer network services. In many scenarios, a cloud-based platform may provide a service to thousands or millions of users (e.g., customers, clients, tenants, etc.) geographically dispersed around a country, or even the world. In order to provide this service, a cloud-based platform often includes different resource units, such as virtual machines or physical machines which are implemented in server farms deployed at various datacenters. In addition, the service can be constructed of various software components such as features, applications, tools, and the like.

To effectively manage a cloud service, particularly a large cloud service, an entity providing the cloud-based service may utilize boundaries to demarcate regions that contain one or more resource units. These demarcated regions may sometimes also be referred to as domains. In addition, each region can include an administrative entity to administrate activity and movement of data within the region. For instance, the administrative entity typically receives and executes jobs received from users (e.g., a developer or a system engineer) using the resource units. In this way, the administrative entity must have complete administrative authority within its associated domain as well as maintain a constant network connection to the various resource units to ensure smooth operation of the platform. Jobs can be comprised of code and/or other mechanisms defining a computational task, software application, as well as code and/or other mechanisms configured to maintain, correct, add, and/or remove functionality associated with the cloud service provided.

To enable users to access resource units within the domain, a cloud service provider typically assigns a respective domain account to each user with resource unit access. In such settings, account authentication can typically be implemented with a username and password system to grant access to the resource units. For example, a user wishing to deploy a software application using the cloud-based platform must first provide their domain account details to access the available resource units.

Unfortunately, typical approaches to cloud-based platform organization as discussed above can lead to critical weaknesses in the security of the cloud-based platform. Stated another way, the constantly connected nature of the various platform components (e.g., resource units and administrative entity) as well as the central importance of the administrative entity can be exploited by malicious actors to compromise the entire cloud-based platform. For instance, in the event an attacker gains access to a resource unit within a domain, the attacker may then move to compromise the associated administrative entity. The authority of the administrative entity can be abused to exfiltrate data, execute arbitrary code, and compromise additional administrative entities at other domains. In a specific example, the attacker may gain access to user's computing device via its connection to the administrative entity. In this example, the victim computing device may be connected to other administrative entities within other domains. As such, the attacker can then move to compromise the other administrative entities and cause widespread harm to the cloud-based platform. In this way, an individual administrative entity of typical cloud-based platforms represents a single point of failure which can lead to platform-wide compromise, severe security breaches, and extended downtime.

Furthermore, traditional cloud-based platforms, in which the administrative entity represents a single point of failure, can suffer from hampered performance as a result. For instance, in typical cloud-based platforms, all jobs must be executed by the administrative entity with remote access to the resource units (e.g., virtual machines). In this way, overall data throughput and task execution are reliant on the capacity of the administrative entity. Organizing a cloud-based platform using traditional methods can thusly prevent a cloud service provider from adequately serving its users and limit scalability of the cloud-based platform.

It is with respect to these and other considerations that the disclosure made herein is presented.

SUMMARY

The disclosed techniques improve the security and functionality of cloud-based services by introducing certificate-based authentication for all communications as well as granular security boundaries. Generally described, a system receives a plurality of jobs for execution at various resource units, authenticates that the job originates from a known trusted source, and provides the job to the intended resource units for execution. The resource units are useable to implement a service and can include physical and/or virtual resources (e.g., processing, storage, and/or networking resources) such as virtual machines, physical machines, and the like. It should also be understood that a job can be comprised of code and/or other mechanisms defining a computational task, software application, as well as code and/or other mechanisms configured to maintain, correct, add, and/or remove functionality associated with the cloud service provided.

In various examples, the resource units can be grouped into servers configured within the same and/or different datacenters. In another example, the resource units may be different networks configured for the same and/or different geographic locations. A group of resource units can be referred to herein as a farm which can collectively be implemented as part of a cloud-based platform to provide a cloud service. The cloud service can include cloud-based applications that provide access to computational resources, databases, and the like from diverse user devices. To streamline management of the cloud-based platform, multiple farms may also be grouped together and managed by an administrative entity often referred to as a control plane. These groups of farms that are managed by a control plane can be referred to as regions. It should be understood that a region can refer to a geographical region (e.g., the Pacific Northwest), a defined geographical area (e.g., 25 square miles), or a digital region that does not relate to a physical area.

As discussed above, existing solutions for cloud-based platform organization denote regions using a domain boundary. Typically, the domain boundary includes the control plane and any farms under the control plane's management including all associated resource units. In such configurations, user authentication is typically implemented using domain accounts and the control plane wields complete authority within the domain. As such, the control plane and farms within a domain are typically constantly connected and communicating. Unfortunately, in the event a farm becomes compromised (e.g., exposed to a security breach), the control plane may also be exposed and thus the entire domain is at risk. In existing cloud-based platforms, a security breach at one domain can enable an attacker to execute arbitrary code, move laterally to compromise other domains, and ultimately compromise the cloud-based platform as a whole. Thus, there is a need for cloud service providers to implement methods for effective authentication and fine-grained isolation in the event of a breach.

In contrast to existing solutions, the disclosed system can effectively mitigate a security breach using fine-grained security boundaries. While a typical cloud-based platform may group all of the farms and control plane in a domain boundary, the system disclosed herein implements a separate security boundary for the control plane as well as a security boundary for each individual farm. As will be discussed further below, isolating various components of the cloud-based platform in this way enables the system to quickly contain a security breach and greatly reduces the potential impact of the security breach.

In addition, certificate-based authentication further enhances security by enabling the system to quickly identify the source of any data and/or signals. As will be elaborated upon further below, an individual certificate can define several values that can be compared to known certificate values to ensure that a given communication originates from a trusted source. For instance, communication between a farm and a control plane can utilize a certificate that includes a certificate type and a unique resource unit identifier. In this way, the control plane can detect that incoming communication originates from a known source and can process the communication accordingly. In addition, each certificate can include an expiration time as well as a validity flag to ensure that extant certificates are legitimate and enable the system to periodically refresh various certificates. Consequently, certificate-based authentication enables the system to eliminate individual domain accounts thereby reducing the likelihood of a breach via compromised accounts through a password leak or similar method.

To enable certificate-based authentication, the system can generate certificate requests for entities within the system such as individual farms, the control plane, as well as individual users. In response, a certificate provider can generate a unique certificate for each request and install the certificate at the appropriate location. Furthermore, copies of each certificate can be securely stored within the system to ensure authenticity. As mentioned above, certificates can also be refreshed periodically via the certificate provider to enhance security. In addition, the system may be configured to validate the certificate provider as a trusted provider. In a specific example, the system may maintain a list of known certificate providers. Upon receiving a certificate, the system may analyze properties of the certificate to determine a certificate provider to ensure that the certificate was generated by a trustworthy provider.

In addition, the system can be configured to monitor active certificates for signs of compromise. For instance, the system may detect that a certificate having a certain certificate type has been tampered with and now defines a different certificate type. In response, the system can automatically revoke permissions associated with the compromised certificate and proceed to isolate the bearer of the compromised certificate (e.g., a resource unit). This, in conjunction with the granular security boundaries, enables the system to quickly mitigate the potential impact of a security breach. In a specific example, a certificate used by a particular resource unit at a farm to communicate with the control plane may be compromised by a malicious actor. In response, the system can disable all communication to and from the farm to isolate the farm within a security barrier. In this way, due to the separate security boundaries for each farm and control plane, no other components of the system would be compromised. At a later point in time, the system may optionally be configured to reintegrate an isolated component back into the cloud-based platform. For instance, a new certificate may be generated for a farm that was previously isolated due to a compromised certificate. As will be discussed below, generating a new certificate can include modifying some or all of the values defined by the certificate.

Furthermore, by securing communication between a control plane and various farms, the system can enable cloud service providers to realize significant improvements to overall system performance and platform scalability. For example, in existing solutions, job execution occurred solely at the control plane using a remote connection to various resource units for computation. In contrast, the disclosed system, through certificate-based authentication, enables the control plane to offload job execution to individual resource units. In this way, the system can bypass limits on scalability discussed above and provide optimal performance for each user. For instance, typical solutions in which all job execution is handled by the control plane require a robust, low latency connection to the resource units. This represents a significant cost in system resources and infrastructure. In contrast, the disclosed system merely requires a connection to offload jobs and send control signals using a standard protocol.

As mentioned above, and in greater detail below, the disclosed techniques enhance security and scalability for cloud-based services through certificate-based authentication and granular security boundaries. In this way, cloud service providers can realize increased performance in their systems, rapidly mitigate security breaches, and minimize any the negative impact of those security breaches on the cloud service.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
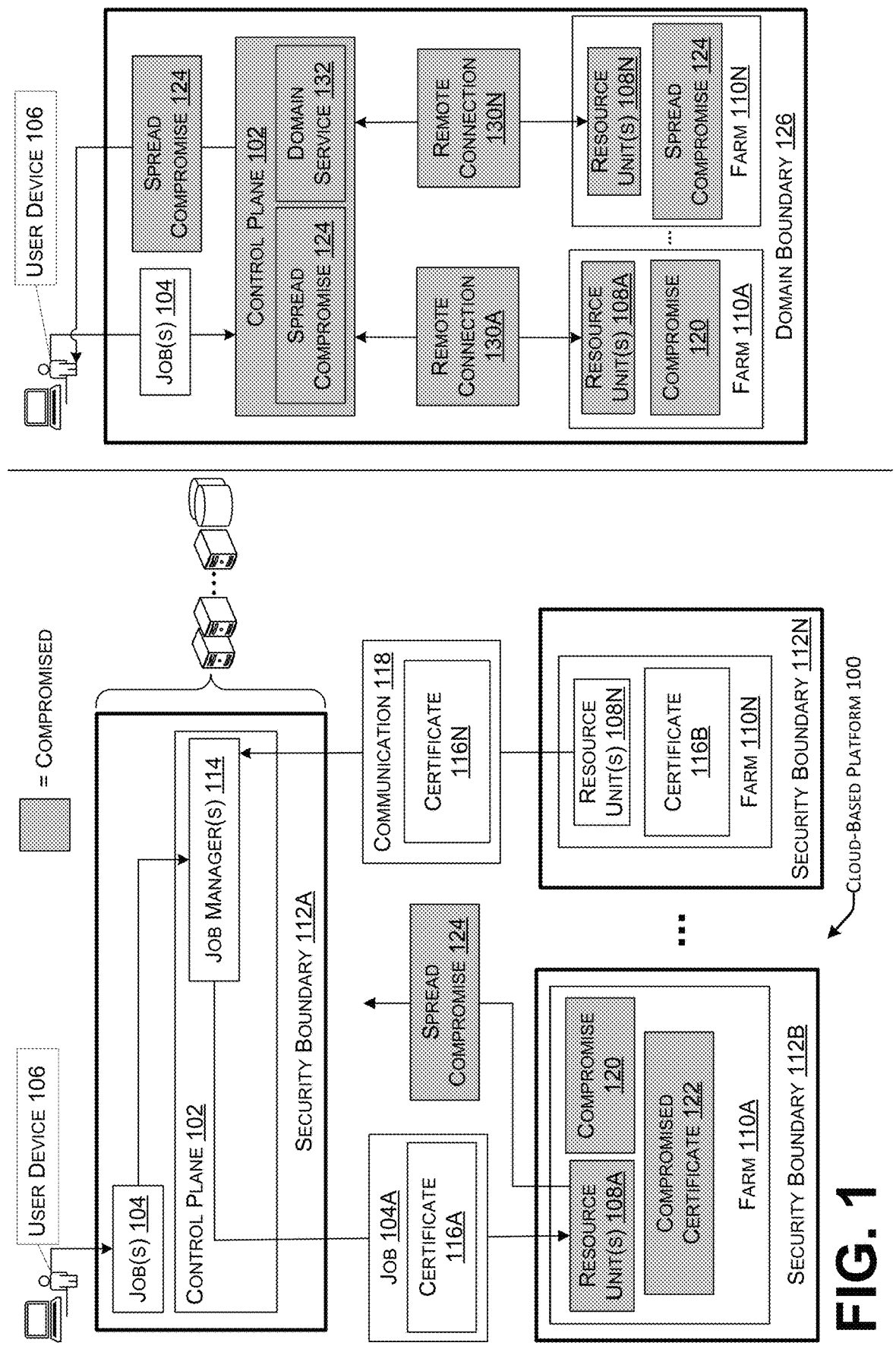
FIG. 1 illustrates the effects of a security breach at a farm for a cloud-based platform.

The techniques described herein provide systems for optimizing the use of computing resources and for improving the security of cloud-based platforms by the introduction of certificate-based authentication and granular security boundaries for managing communication between a control plane and various resource units. As mentioned above, resource units can include physical machines, virtual machines, and the like. A plurality of these resource units can additionally be organized into a farm which may be managed by an administrative entity such as a control plane. Various farms and control planes can form a cloud-based platform which may be configured to provide a cloud service that enables users (e.g., developers or engineers) to execute various jobs. As mentioned, a job can be comprised of code and/or other mechanisms defining a computational task, software application, as well as code and/or other mechanisms configured to maintain, correct, add, and/or remove functionality associated with the cloud service provided.

The disclosed techniques address several technical problems associated with cloud-based platform organization. For example, the disclosed system bolsters the overall security of cloud-based platforms by implementing granular security boundaries to dramatically reduce the potential impact of a security breach in contrast to existing systems that rely upon larger domain boundaries. Consider for example, a situation in which an attacker compromises a farm to gain access to a resource within the farm. In typical systems, the compromise may spread throughout the domain unabated resulting in compromised farms and ultimately the control plane. The attacker may then use the control plane to compromise other control planes thereby causing widespread damage to the cloud-based platform. In contrast, as will be elaborated upon further below, the disclosed system can rapidly mitigate the breach by isolating the compromised farm within a security boundary to prevent the spread of the compromise.

In addition, the disclosed techniques further enhance security through certificate-based authentication for all communications between the control plane and various farms under the management of the control plane. In a specific example, the cloud-based platform can receive a job from a user device via a control plane for execution. In typical systems, execution of the job occurs at the control plane utilizing a remote connection to resource units at a farm via a domain account. This approach, while functional, requires complete trust between the control plane and the resource units. In the event an attacker compromises a control plane, the authority of the control plane can be abused by the attacker to execute arbitrary code at the farms within the domain. However, as will be discussed below, by utilizing certificate-based authentication as disclosed herein, the cloud-based platform can ensure that all communications originate from trusted sources. Furthermore, the cloud-based platform can be configured to monitor the status of active certificates to detect compromises and periodically refresh expired certificates. In this way, the cloud-based platform can ensure that all certificates remain valid.

By implementing the granular security boundaries and certificate-based authentication as mentioned above and further below, the disclosed techniques enable several crucial technical benefits in addition to the enhanced security discussed above. For example, in existing systems, since job execution occurs at the control plane, the computational throughput of the cloud-based system is constrained by the capacity of the control plane. Subsequently, system performance can degrade over time as the cloud service provided by the cloud-based platform grows (e.g., increasing user-base, clients, etc.). In contrast, securing communications between the control plane and farms enables the system to offload job execution to the various resource units themselves. In this way, the techniques disclosed herein can remove the bottleneck of the control plane and dramatically improve the job throughput of the cloud-based platform.

In another example of the technical benefit of the present disclosure, the granular security boundaries and certificate enables the cloud-based platform to maintain resource unit availability even in the event of a security breach. As mentioned above, the granular security boundaries enable the system to contain a security breach within a single component of the cloud-based platform (e.g., a single farm). For instance, the disclosed system may detect that a certificate at a particular farm has been compromised. In response, the system can deem the certificate compromised and accordingly revoke any associated permissions such as disabling communication from the affected farm and limiting available functionality. In this way, other farms are not affected by the breach and thus users perceive no changes in service.

Various examples, scenarios, and aspects that enable granular security boundaries and certificate-based authentication are described below with reference to FIGS. 1-9.

The left-hand portion of FIG. 1 illustrates an example cloud-based platform 100 (e.g., system) in which a control plane 102 is configured to receive a plurality of jobs 104 from a user device 106 and dispatch individual jobs 104A to a destination resource unit 108A within a farm 110A identified amongst a set of farms 110A-N. The set of farms 110A-N may collectively be referred to as farms 110. Received jobs 104 can enter a job queue to await processing by the control plane 102. As mentioned above and as shown, each farm 110A-N can contain a plurality of resource units 108A-N which can include virtual machines, physical machines, and/or other computational infrastructure. Each component of the cloud-based platform 100 is encompassed by a corresponding security boundary 112A-N. For instance, control plane 102 and associated job managers 114 are encompassed by a first security boundary 112A while farm 110A resides within a second security boundary 112B. It should be understood that the cloud-based platform 100 can generate any number of security boundaries 112A-N to contain the control plane 102 and each farm 110A-N. It should be understood that in reference to farms 110A-N, N may be any number (e.g., tens or hundreds) while in reference to security boundaries 112A-N, N may be a different number.

As discussed above, the cloud-based platform 100 can utilize certificates 116A-N to authenticate all transmissions between the control plane 102 within the first security boundary 112A and a farm 110A within a second security boundary 112B. In a specific example, job manager 114 transmits a job 104A to resource unit 108A at farm 110A. To ensure that the job 104A originates from a trusted source, job manager 114 includes a certificate 116A in the transmission of job 104A. As will be elaborated upon further below, farm 110A can analyze and compare various values defined by certificate 116A against a predefined certificate signature such as a network identification, a certificate type, and so forth. If the certificate 116A matches the predefined certificate signature, the resource units 108A can accept and execute the job 104A. In another example, job 104A may specify that it is to be executed by a specific type of resource unit 108A such as a virtual machine. The targeted resource unit 108A may accordingly include a mechanism to authenticate certificate 116A and accept the job 104A. In a specific example, the resource unit 108A can include a job agent to accept a certificate-based application programming interface (API) before proceeding to execute operations defined by the job 104A.

Likewise, transmissions that originate from farms 110 and target the control plane 102 can also be authenticated using a certificate 116N. For instance, resource unit 108N within farm 110N may generate a communication 118 and attempt to transmit the communication 118 to a job manager 114 of control plane 102. Communication 118 may be generated to report the status of various jobs 104 that are in progress at resource unit 108N. To authenticate the communication 118, resource unit 108N can include certificate 116N in communication 118. Like certificate 116A, certificate 116N can define a plurality of values such as a resource unit identifier that job manager 114 or control plane 102 can analyze to compare against a known certificate signature to ensure that communication 118 is trusted and legitimate.

To enhance security, cloud-based platform 100 may also be configured to monitor active certificates 116 for signs of malicious activity or other compromises as mentioned above. For example, an attacker may gain access to a farm 110A by way of a compromise 120. Compromise 120 can be any unauthorized mode of access to farm 110A and/or resource units 108A such as physical access, remote access over a network, malicious software, or other such methods. Compromised components of the cloud-based platform 100 are shown in FIG. 1 as shaded.

In this example, the attacker may use compromise 120 to generate a compromised certificate 122. For instance, the attacker may modify the compromised certificate 122 to grant themselves administrative privileges. The attacker may attempt to then transmit a spread compromise 124 to the control plane 102 using the compromised certificate 122. As will be discussed below, if the attacker successfully gains access to control plane 102, they may attempt to abuse the connectivity of control plane 102 to cause widespread harm to the cloud-based platform 100. However, cloud-based platform 100 can detect that the transmission comprising the spread compromise 124 is attempting to authenticate using a compromised certificate 122 indicating an unknown or untrustworthy source. In response, cloud-based platform 100 can isolate farm 110A within security boundary 112B by disabling incoming and outgoing transmissions, revoking the compromised certificate 122, and/or notifying a system administrator, on-call engineer, or other appropriate measures.

As shown in FIG. 1, by quickly detecting and isolating the compromise 120 and disabling compromised certificate 122, the cloud-based platform 100 can prevent the spread compromise 124 from reaching the control plane 102 within security boundary 112A as well as other farms 110 within other security boundaries 112. In this way, the potential harm of the original compromise 120 may be greatly limited and high resource availability can be maintained since only farm 110A was affected. Furthermore, downtime caused by the compromise 120 can be minimized because of the security boundary 112B isolation and thus minimal engineering effort is required to restore full functionality to farm 110A.

In another example, a security breach may occur at a control plane 102. In response, the cloud-based platform may take similar action as discussed above by restricting communication to and from the control plane 102. In addition, various modes of functionality of the control plane 102 may be disabled and/or restricted to limit the attacker to pre-defined operations and prevent execution of arbitrary code. For instance, an attacker may wish to permanently disable a particular control plane 102 by attempting to install malicious software. However, because the malicious software defines actions that are not part of the pre-defined operations, it can be prevented from executing. This approach, in combination with the security boundary 112A, enables the cloud-based system 100 to effectively mitigate the attack and prevent the spread of the compromise 120.

In contrast to the techniques shown and discussed with respect to the left-hand side of FIG. 1, a cloud-based platform is shown on the right-hand side of FIG. 1 with a typical approach to organization. In this arrangement, the cloud-based platform does not utilize certificates 116 for authentication and each component of the cloud-based platform is not encompassed within a security boundary 112. Instead, as discussed above, existing cloud-based systems can merely group the control plane 102 and all farms 110 managed by the control plane 102 within a domain boundary 126. In addition, rather than authenticate transmissions between the control plane 102 and various farms 110A-N as discussed above with respect to the left side of FIG. 1, the cloud-based platform may simply establish remote connections 130A-N to the various resource units 108A-N within their respective farms 110A-N. Accordingly, the remote connections 130A-N require complete trust between the control plane 102 and the resource units 108A-N. Additionally, the remote connection must be very robust and low-latency due to its crucial role in job execution, which occurs at control plane 102 rather than at the appropriate resource units 108 as shown and described on the left-hand side of FIG. 1.

Furthermore, in lieu of the certificates 116 as discussed above, the cloud-based platform shown on the right-hand side of FIG. 1 may utilize a single domain service 132 at control plane 102 to manage all the farms 110A-110N that are encompassed by domain boundary 126. As mentioned, this domain service 132 can represent a single point of failure for the cloud-based system. For instance, if the domain service 132 becomes unresponsive or unstable, availability of all resource units 108A-N within the domain boundary 126 may be lost. As also mentioned above, the control plane 102 can restrict the performance of the cloud-based platform as throughput of jobs 104 is dependent on the capacity of the control plane 102 and domain service 132.

Even more importantly however, the central importance of the control plane 102 and domain service 132 can pose a significant threat to the overall security of the cloud-based platform in the event that it is compromised. For example, an attacker may gain access to resource units 108A at a farm 110A via a compromise 120, similar to the example discussed above with respect to the left-hand side of FIG. 1. However, unlike the previous example, cloud-based platform is unable to readily detect that an attack has occurred and cannot isolate the affected farm 110A within its own security boundary. Thus, the attacker is free to hijack the remote connection 130A to the control plane 102 and infect the control 102 with the spread compromise 124.

Accordingly, the attacker now has control of the control plane 102 and crucially, the domain service 132. The attacker can subsequently abuse the authority of the domain service 132 to infect other farms 110N with the spread compromise 124 as well as exit the domain boundary 126 to inflict more widespread harm. For instance, once the attacker has seized the control plane 102, they may then exfiltrate data, execute arbitrary code, and even move laterally to infect other control planes 102 within other domain boundaries 126 with spread compromise 124. In a specific example, the attacker may move to a user device 106 through its connection to the control plane 102. In this example, the user device 106 may be simultaneously connected to other domain boundaries 126. As such, the attacker may extract account information or other details to gain access to these other domain boundaries 126. In this way, the attacker can cause severe disruptions to various cloud services provided by the cloud-based platform, acquire the personal information of thousands or even millions of users, and ultimately damage the reputation of the cloud service provider as well as clients or tenants that host applications or services on the cloud-based platform.

Figure 2:
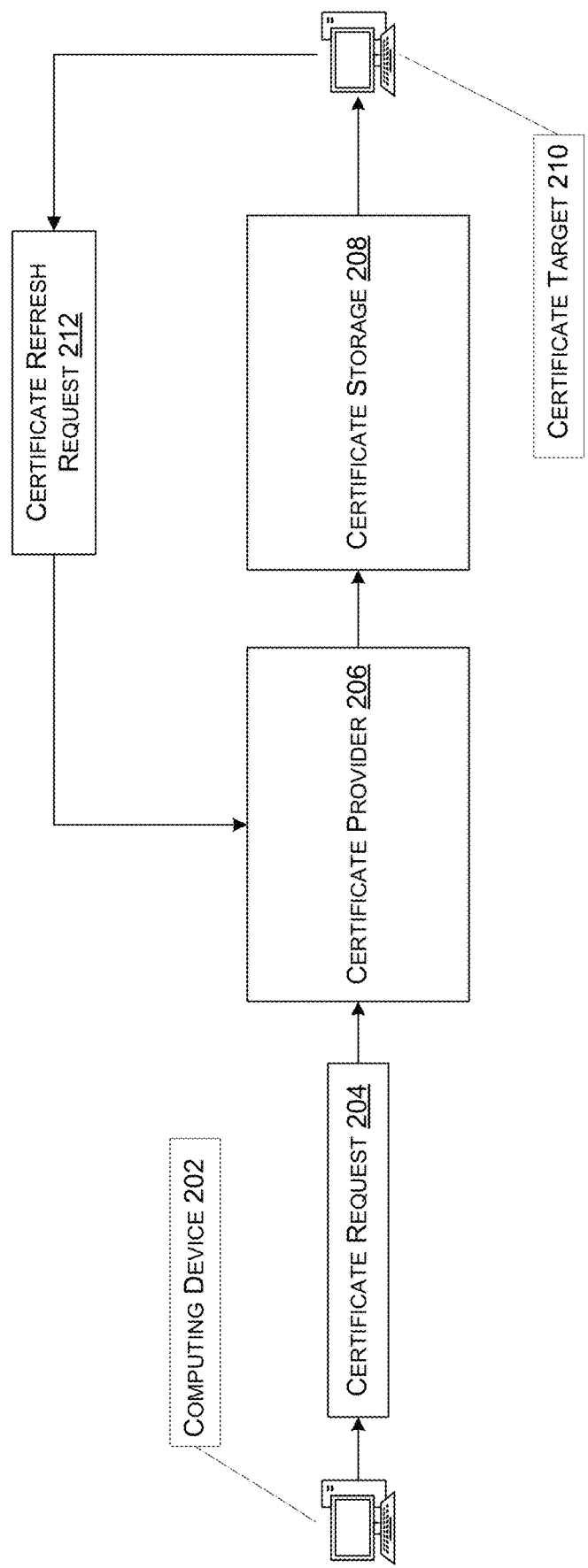
FIG. 2 is a block diagram illustrating a process for requesting and generating a certificate to enable certificate-based authentication.

Proceeding now for FIG. 2, aspects of a process for requesting, generating, and storing certificates are shown and described. Generally described, a computing device 202 can generate a certificate request 204. In various examples, computing device 202 can belong to a system administrator, platform engineer, or other administrative user. Accordingly, the computing device 202 can be used by the administrative user to configure components that are new to the cloud-based platform 100 such as a newly installed farm 110. Alternatively, certificate request 204 may be generated automatically by the computing device 202 in response to detecting a new addition to the cloud-based platform 100. The certificate request 204 can specify values for various information fields for the requested certificate 116 such as a certificate type, user identifier, and so forth.

Subsequently, certificate request 204 can be transmitted to a certificate provider 206 to generate a certificate 116 that includes the values specific by the certificate request 204. In various examples, certificate provider 206 can be a software module that automatically processes the certificate request 204 and generates the requested certificate 116 with each of the specified values. Alternatively, certificate provider 206 may be a software module that enables an administrative user such as a system administrator or platform engineer to process the certificate request 204 manually. In addition, certificate provider 206 can be configured with default certificate values to utilize should the certificate request 204 not specify a value for all certificate fields. For instance, certificate request 204 may specify a requested certificate type but not a network identifier. Certificate provider 206 can accordingly configure the certificate 116 with a default network identifier.

Certificate provider 206 can also be responsible for securely storing the generated certificate 116 at certificate storage 208. Certificate storage 208 can be any suitable method of securely housing and tracking information for active certificates such as a central database, network share, or other method. Furthermore, certificate storage 208 can be configured to deploy various certificates 116 to their respective certificate targets 210. For example, a generated certificate 116 may be intended for a farm 110 containing virtual machines. Certificate storage 208 may utilize various modules or tools to install a copy of the appropriate certificate 116 at each certificate target 210. Certificate targets 210 can include farms 110, control planes 102, user devices 106, or any other component capable of communication within the cloud-based platform 100. It should be understood that certificates 116 can be automatically installed from certificate storage 208 or manually copied from certificate storage 208 and installed by an administrative user such as a platform engineer.

Once installed at the correct certificate target 210, the generated certificate 116 can enable the certificate target 210 to communicate within the cloud-based platform as well as other features and permissions defined by the certificate 116. In addition, as will be elaborated upon below, each generated certificate 116 can be configured with an expiration time. The disclosed system can be configured to monitor active certificates 116 and detect certificates 116 that are nearing their configured expiration time. Accordingly, a certificate refresh request 212 can be generated and transmitted to certificate provider 206. In response, certificate provider 206 can generate an updated certificate 116 with matching parameters or values. In various examples, the certificate monitoring process can be performed constantly or periodically (e.g., once a day). The updated certificate 116 can then be transmitted to certificate storage 208 and accordingly installed at the certificate target 210.

Figure 3:
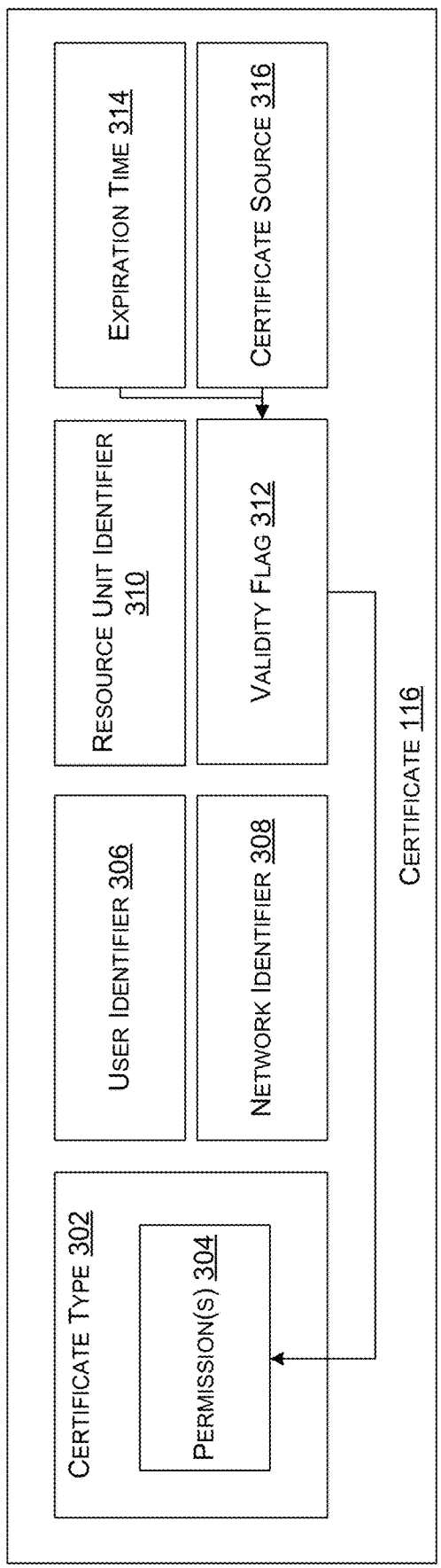
FIG. 3 illustrates various aspects of an individual certificate.

Turning now to FIG. 3, aspects of an individual certificate are shown and described. As mentioned above, a certificate 116 can define a plurality of values for identifying a source of a given transmission. For instance, certificate 116 may define a certificate type 302 that indicates a category of certificate 116. In various examples, the certificate type 302 can also define a set of permissions 304 that are associated with the certificate type 302. In a specific example, certificate type 302 can indicate that certificate 116 is a farm client certificate. Accordingly, a certificate target 210 for a farm client certificate may be an individual farm 110. As the bearer of a farm client certificate, certificate 116 can enable the farm 110 to transmit communications between itself and an associated control plane 102 and/or execute code. In other examples, certificate type 302 may indicate that certificate 116 is a trusted root certificate. A trusted root certificate may be installed at a control plane 102 and define permissions 304 that enable the control plane 102 to request and/or generate certificates 116 for farms 110 under its management.

An individual certificate 116 may also define a user identifier 306 that indicates a particular user or user device 106 associated with the certificate 116. For instance, user identifier 306 may indicate that certificate 116 is associated with a staff engineer and/or originates from a user device 106 that belongs to a staff engineer. In addition, various user identifier may also influence which permissions 304 are available to the bearer of the certificate. For instance, a certificate 116 with a user identifier 306 indicating a system administrator may have a different set of permissions 304 from a certificate 116 with a user identifier 306 indicating a support specialist despite both certificates 116 potentially sharing a same certificate type 302.

Similarly, certificate 116 can include a network identifier 308 to indicate a network from the which the certificate originated. For example, network identifier 308 can indicate that an associated transmission originates from a client network such as a tenant of the cloud-based platform 100. In other examples, network identifier 308 can identify networks with a numerical value. It should be understood that network identifier 308 can utilize any other suitable naming scheme to identify various networks. In addition, resource unit identifier 310 can serve to provide further details on the origin of an associated transmission such as a job 104, or a communication 118. For instance, resource unit identifier 310 can indicate that an associated transmission originates from a particular resource unit 108A within a farm 110A. Alternatively, resource unit identifier 310 can be configured to identify a farm 110A rather than a specific resource unit 108A.

In alternative examples, resource unit identifier 310 may serve to identify which resource units 108 are targeted by the associated transmission. For instance, a job 104A may target a specific type of resource unit 108A such as a virtual machine. Accordingly, the certificate 116A associated with job 104A may have a resource unit identifier 310 that specifies virtual machines.

In addition, network identifier 308 may be configured to block changes to its value after initial configuration. In a specific example, a certificate 116N may be deployed at a particular farm 110A. As such, network identifier 308 should not be modified after installation at the farm 110A as it may be unlikely that farm 110A will change network locations. Should network conditions change that necessitate a modification to network identifier 308, a new certificate 116 can be generated via a certificate request 204 to replace the existing certificate 116. Such techniques may also be applied to other values of the certificate 116 such as the certificate type 302 and user identifier 306. In this way, the certificate 116 can resist tampering in the event of a security breach or other unauthorized access.

Furthermore, certificate 116 can include a validity flag 312 to readily indicate whether a certificate 116 is valid or legitimate. In various examples, validity flag 312 can be a simple Boolean value (e.g., true or false). For instance, a certificate generated by certificate provider 206 and stored at certificate storage 208 can have a validity flag 312 that indicates certificate 116 is valid (e.g., validity flag 312 is set to true). Following deployment of the certificate 116 to certificate target 210, a security breach may occur and certificate 116 is compromised. In response, cloud-platform 100 can modify the validity flag 312 to indicate that certificate 116 is no longer valid (e.g., validity flag 312 is set to false). In other examples, validity flag 312 can be configured to provide additional information regarding the status of certificate 116. For example, while the certificate is valid, validity flag 312 may also include data describing the provenance or usage history of the certificate 116 such as the original certificate request, date of creation, the certificate provider 206 that generated the certificate 116, and so forth. In another example, validity flag 312 may be updated with additional information in response to a security breach. In a specific example, an attacker may attempt to tamper with the certificate type 302 and user identifier 306. In addition to modifying the validity flag 312 in response to the attack, validity flag 312 may also be configured to indicate which changes were made to which values, potential origins of the attack, and other relevant information.

In addition, validity flag 312 can have control over various permissions 304 associated with the certificate type 302 and/or user identifier 306. Naturally, if validity flag 312 indicates that certificate 116 is valid, then the bearer of certificate 116 may access the various privileges and functionalities defined by the permissions 304. Conversely, if the certificate 116 is invalid, the privileges and functionalities defined by permissions 304 may be disabled and/or restricted.

Certificate 116 can also include an expiration time 314. As mentioned above, including an expiration time 314 in each certificate 116 enables the cloud-based platform 100 to efficiently monitor and periodically refresh active certificate 116. In some examples, expiration time 314 can be configured based on the certificate type 302. In a specific example, a farm client certificate type 302 may correspond to an expiration time 314 of thirty days while a trusted root certificate may have a shorter expiration time 314 of ten days. When the expiration time 314 for a certificate 116 elapses, certificate 116 may automatically respond by modifying the validity flag 312 to indicate that certificate 116 is no longer valid. As mentioned above, this may then result in restriction of permissions 304 to disable various functionalities and privileges. As discussed, the bearer of certificate 116 (e.g., certificate target 210) must then generate a certificate refresh request 212 to ensure continued access to cloud-based network 100. Alternatively, cloud-based platform 100 may be configured to automatically generate certificate refresh requests 212 for certificates that are nearing their respective expiration time 314. For instance, cloud-based platform 100 can be configured to detect that a certificate 116 has a threshold portion of expiration time 314 remaining (e.g., 20%) or a threshold amount of expiration time 314 (e.g., 2 days). In response to detecting that the certificate 116 falls below the threshold expiration time 314, the cloud-based platform 100 may then generate a certificate refresh request 212.

Finally, certificate 116 can include a certificate source 316 to identify the original issuer of a certificate such as a certificate provider 206. Certificate source 316 can be extracted by the cloud-based platform 100 to determine whether certificate 116 was generated by a trustworthy source. In a specific example, cloud-based platform 100 may maintain a list of trusted certificate providers 206. If an extracted certificate source 316 does not match a trusted certificate provider 206, the cloud-based platform 100 may be configured to mark the certificate 116 as invalid by modifying validity flag 312. In another example, the recipient of a transmission associated with certificate 116 may communicate with a certificate provider 206 defined by certificate source 316 to verify the source of certificate 116. For instance, the recipient may provide the certificate provider 206 with a certificate identification such as a certificate name or serial number of certificate 116. In response, the certificate provider 206 may determine whether certificate 116 was originally generated by certificate provider 206 and inform cloud-based platform 100 as to the authenticity of certificate 116. It should be understood that any suitable method may be utilized instead of, or in combination with, the examples discussed above to validate certificate source 316.

Figure 4A:
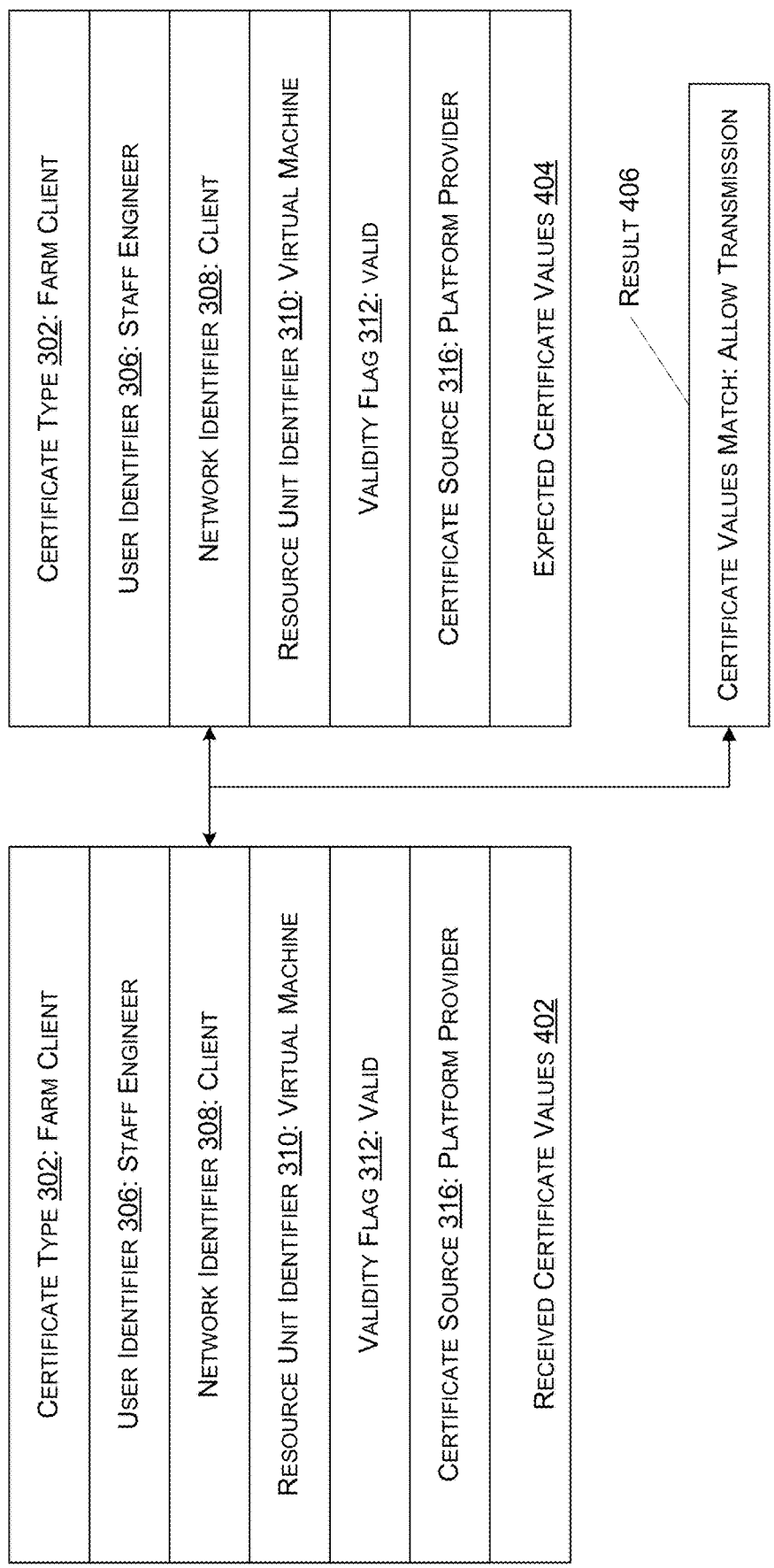
FIG. 4A illustrates a process for comparing values from a received certificate against expected values from a predefined certificate signature.

Proceeding now to FIG. 4A, aspects of a process for authenticating a certificate 116 are shown and described. A target for a transmission within cloud-based platform 100 can receive and analyze received certificate values 402 for comparison against a predefined certificate signature such as expected certificate values 404. If the received certificate values 402 match the expected certificate values 404, the target can then receive and process the transmission accordingly. In a specific example, a control plane 102 may receive a job 104A that targets a resource unit 108A at farm 110A. To transmit the job 104A to resource unit 108A for execution, control plane 102 must also provide a certificate 116A for authentication. Accordingly, the targeted resource unit 108A can receive the certificate 116A and ensure that the job 104A originates from a trustworthy source prior to executing the various functions defined by the job 104A.

As discussed above, a certificate 116A can define various values such as a certificate type 302, a user identifier 306, and so forth. As shown in FIG. 4A, received certificate values 402 defines a "farm client" certificate type 302, a "staff engineer" user identifier 306, a "client" network identifier 308, a "virtual machine" resource unit identifier 310, a "valid" validity flag 312, and a "platform provider" certificate source 316. These received certificate values 402 can be extracted and analyzed by a target of a transmission associated with the certificate 116A such as the resource unit 108A that receives job 104A in the example above. Once extracted, received certificate values 402 can be compared against the expected certificate values 404 for authentication. As shown in FIG. 4A, the received certificate values 402 do in fact match the certificate type 302, user identifier 306, network identifier 308, resource unit identifier 310, validity flag 312, and certificate source 316 defined by the expected certificate values 404. In response, the target of the transmission can generate a result 406 indicating that the transmission associated with certificate 116 is authenticated and that transmission from this source is allowed. Allowance of the transmission can include accepting and responding to a communication 118, accepting and executing signed code for a job 104A, and the like. In other examples, certificate-based authentication may also include transmitting a second certificate 116 from the target of the transmission for additional authentication. In a specific example, a resource unit 108A may receive a job 104A from a control plane 102 with an accompanying certificate 116A. Upon authenticating certificate 116A, the resource unit 108A may respond with a certificate 116N of its own to further secure the transmission.

Expected certificate values 404 can be determined in several ways. For example, an incoming transmission may include metadata indicating a certain type of transmission (e.g., a communication 118 or job 104). In response, the target of the transmission such as a resource unit 108A can select certain expected certificate values 404 such as an expected certificate type 302 or an expected network identifier. Alternatively, a certain component of cloud-based platform 100 may serve a specialized role or other purpose in which it only receives certain transmissions such as a particular resource unit 108 that executes jobs 104. Accordingly, the component can be configured with a fixed set of expected certificate values 404 that suit its expected operating environment. It should be understood that expected certificate values 404 can be determined, retrieved, and/or otherwise configured in any suitable way for each individual component of the cloud-based platform 100.

Figure 4B:
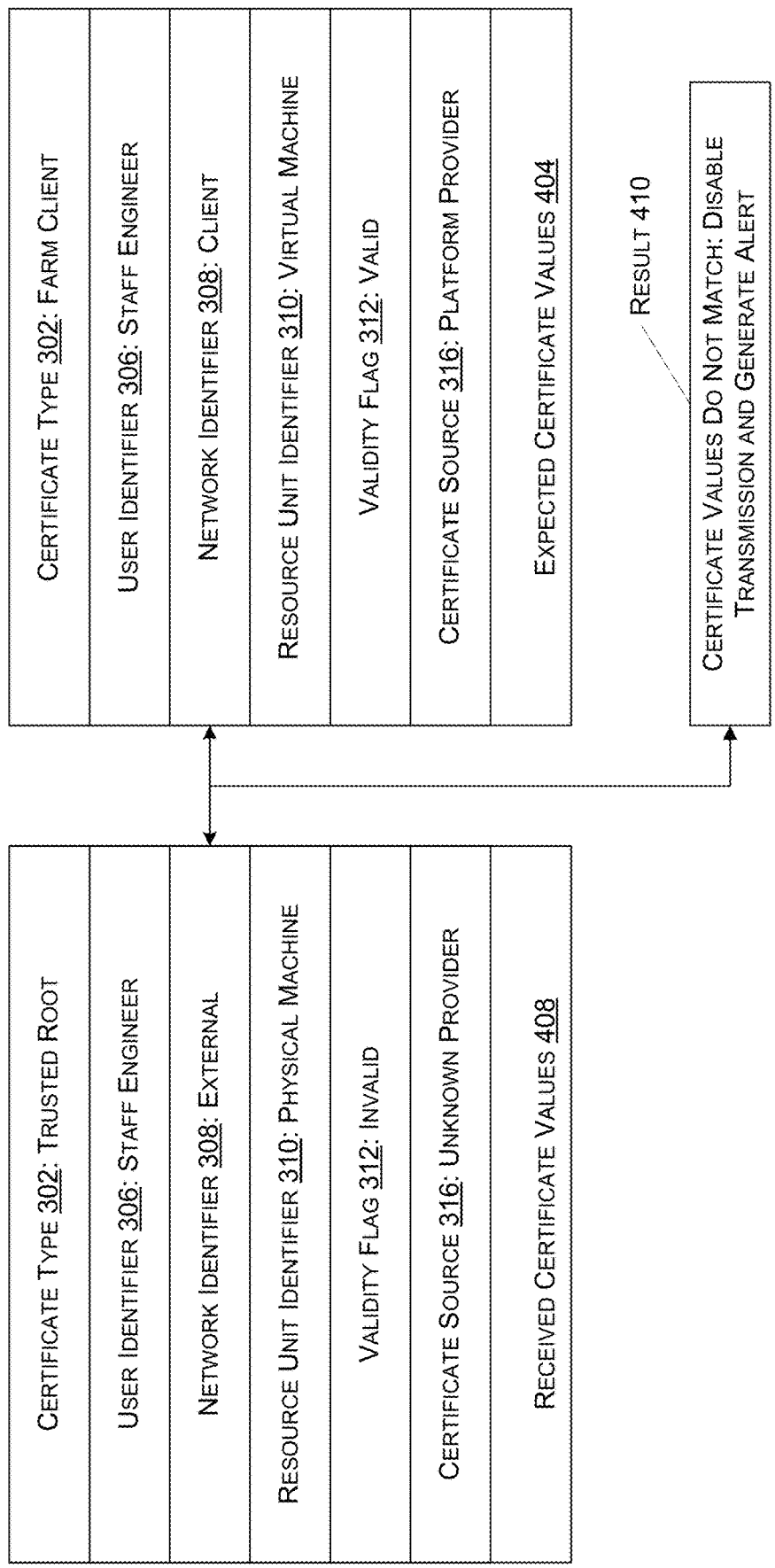
FIG. 4B illustrates an alternative outcome of the process for comparing a certificate against a predefined certificate signature.

Alternatively, as shown in FIG. 4B some received certificate values 402 of a certificate 116A may fail to match those defined by expected certificate values 404. For example, certificate type 302 defined by received certificate values 408 claims that certificate 116A is a trusted root certificate. However, the target of the transmission anticipates a farm client certificate type 302 as shown in expected certificate values 404, similar to the scenario in FIG. 4A. In response, the target (e.g., a resource unit 108A) can determine that the transmission cannot be authenticated due to incorrect received certificate values 408. In response, a result 410 can be generated indicating that received certificate values 408 do not match expected values 404 and various actions can be taken accordingly. In a specific example, result 410 can cause cloud-based platform 100 to disable transmissions from the source of the faulty certificate. Cloud-based platform 100 may also generate an alert to notify an administrative user such as platform engineer or system administrator of the faulty certificate. In some examples, the faulty certificate may be a compromised certificate 122 that is part of a security breach. For instance, received certificate values 408 may be identified as a compromised certificate 122 based on the "external" network identifier 308 and the "invalid" validity flag 312. As such, by quickly detecting the compromised certificate 122 and disabling transmissions associated with the compromised certificate 122, the security breach can be easily mitigated with minimal manual intervention. In another example, as shown in FIG. 4B, certificate source 316 of received certificate values 408 may be defined as an "unknown provider." Accordingly, the certificate may be marked as invalid my modifying validity flag 312 and transmissions associated with received certificate values 408 can be deemed as untrustworthy and thus rejected.

In other examples, the recipient of the received certificate values 408 can determine whether the certificate was tampered with or merely misconfigured such as a mistake when manually setting parameters of the certificate 116. In the example discussed above, for instance, it may be determined that the mismatched certificate type 302 was tampered with based on a usage history provided by the validity flag 312 as discussed above with respect to FIG. 3. In another example, the transmission target may determine that while the received certificate values 408 do not match expected certificate values 404, the overall certificate 116 may not necessarily be compromised. For instance, as shown in FIG. 4B, received certificate values 408 may specify a "physical machine" resource unit identifier 310 while expected certificate values 404 define a "virtual machine" resource unit identifier 310. However, in this example, perhaps all other constituent values of received certificate values 408 match the expected certificate values 404 such as the validity flag 312, certificate type 302 and so forth. As such, while result 410 still indicates that certificate values do not match, the alert may simply notify the administrative user that resource unit identifier 310 was improperly configured rather than raise the alarm for a security breach. Accordingly, restrictions on functionality of the source of the faulty certificate 116 may also be less severe than in a security breach. For instance, while the target may decline the transmission associated with received certificate values 408, transmissions from the source may not necessarily be disabled.

Figure 5:
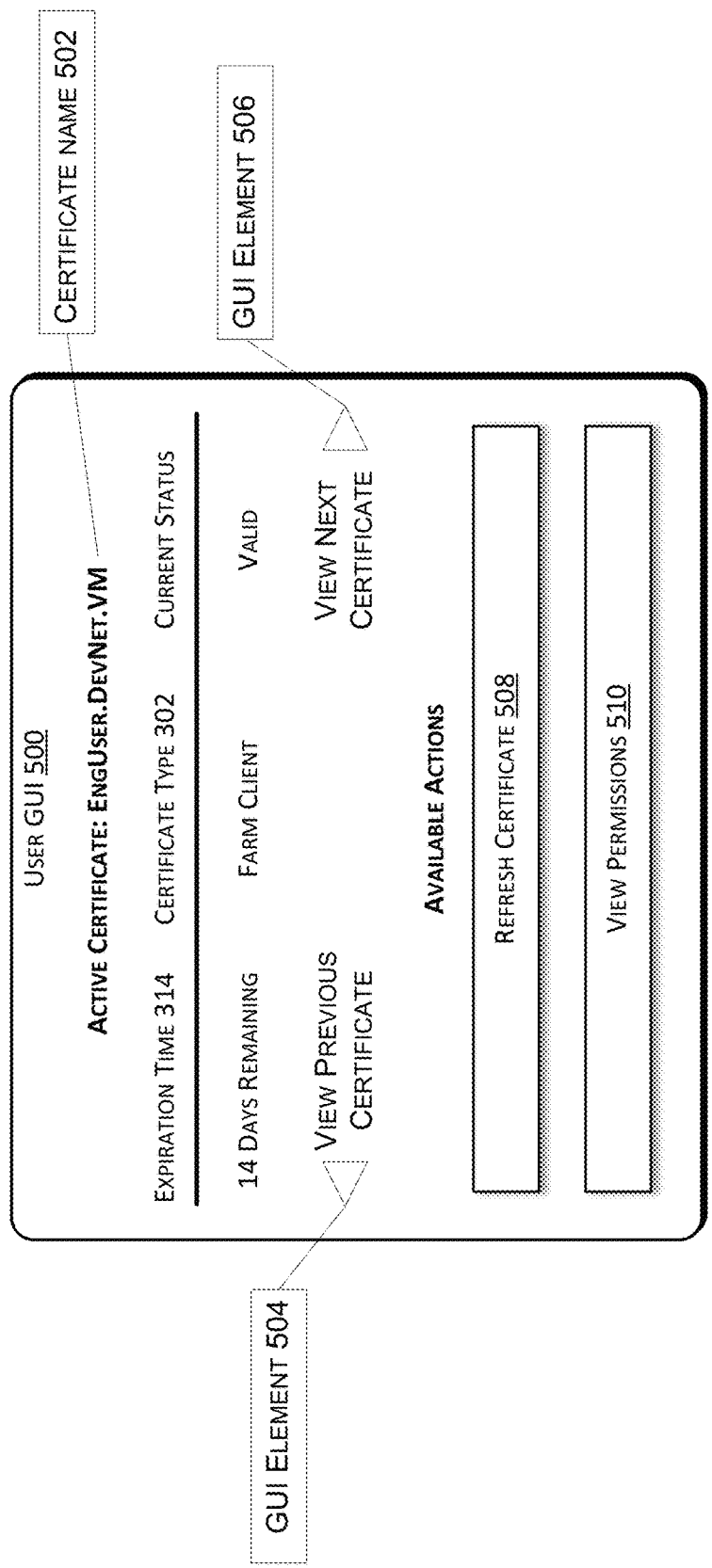
FIG. 5 illustrates an example user interface (UI) to enable a user to view and manage a certificate.

Turning now to FIG. 5, aspects of a user graphical user interface (GUI) 500 for viewing and managing active certificates are shown and described. In various examples, user GUI 500 can be used by a system administrator, platform engineer, developer, or other user with access to the cloud-based platform 100 to manage active certificates. For instance, user GUI 500 can include a certificate name 502 to identify the certificate 116A that is currently being viewed. Certificate name 502 can include some or all of the various values defined within the certificate itself. In a specific example, certificate name 502 as shown in FIG. 5 identifies an "EngUser" or "Engineering User" user identifier 306, a "DevNet" or "Development Network" network identifier 308, and a "VM" or "Virtual Machine" resource unit identifier 310. It should be understood that certificate name 502 can be generated and presented using any suitable format and include any information regarding the associated certificate 116A. Active certificates 116 may be retrieved from certificate storage 208 for viewing within user GUI 500.

In addition, user GUI 500 can present other specific information on the certificate 116A. For example, user GUI 500 displays a remaining expiration time 314 for certificate 116A alongside a certificate type 302 and a current status which can be determined from validity flag 312. User GUI 500 can further include GUI element 504 for enabling a user to view another active certificate 116. Similarly, GUI element 506 enables the user to cycle to the next active certificate. It should be understood that certificates 116 can be ordered in any suitable way such as in alphabetical order by name, certificate type 302, or expiration time 314.

Furthermore, user GUI 500 can include selectable elements that enable the user to take action for a particular certificate 116A. As shown in FIG. 5, the user may elect to select refresh certificate 508 to generate a certificate refresh request 212 and extend expiration time 314 for the certificate 116A. In addition, the user can select view permissions 510 to view various privileges or functionalities that are available to the certificate 116A as defined by permissions 304. For instance, selecting view permissions 510 can inform the user that certificate 116A enables transmissions between a farm 110A and control plane 102.

Figure 6:
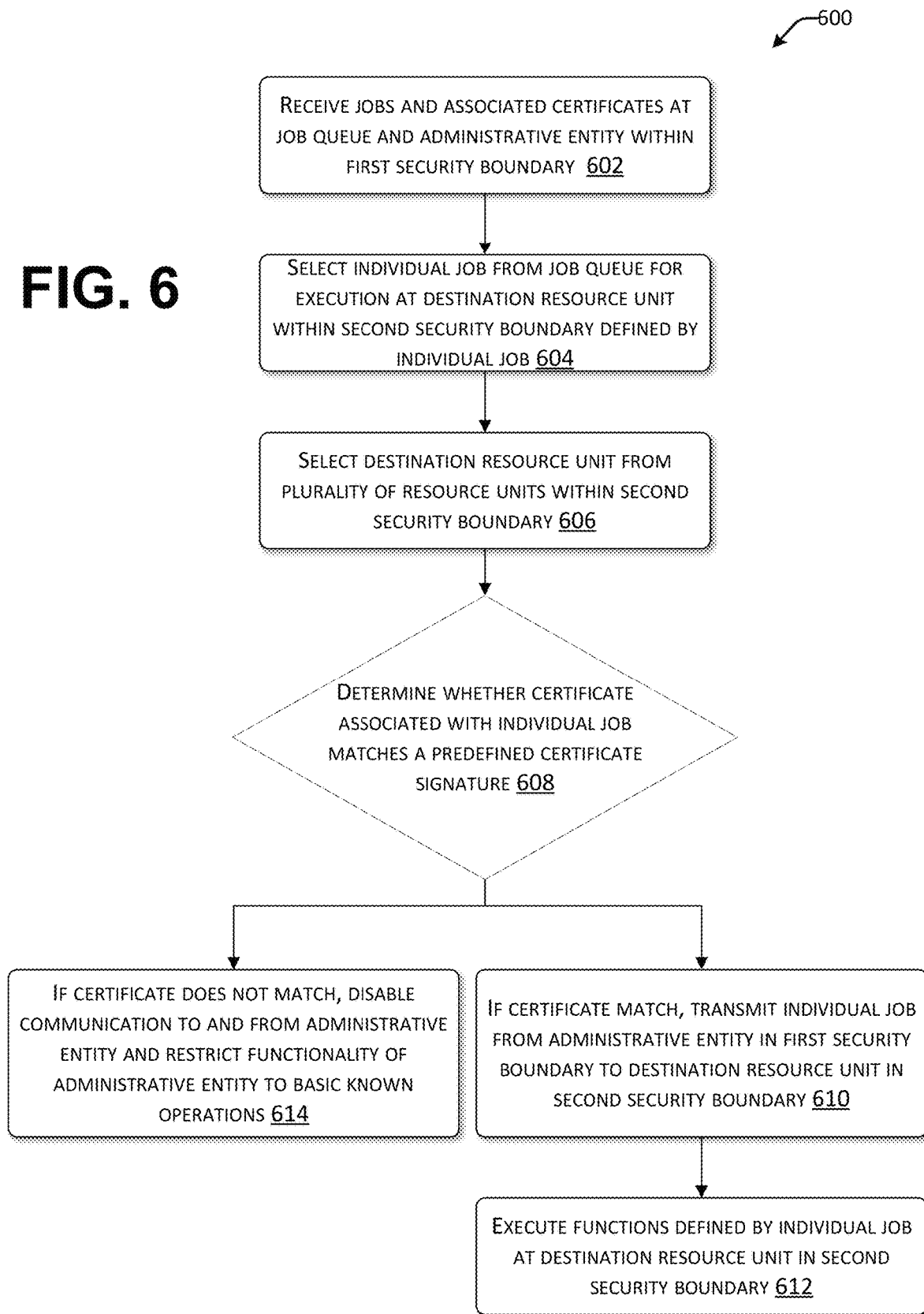
FIG. 6 is a flow diagram of an example routine for performing job management using certificate-based authentication.
Figure 7:
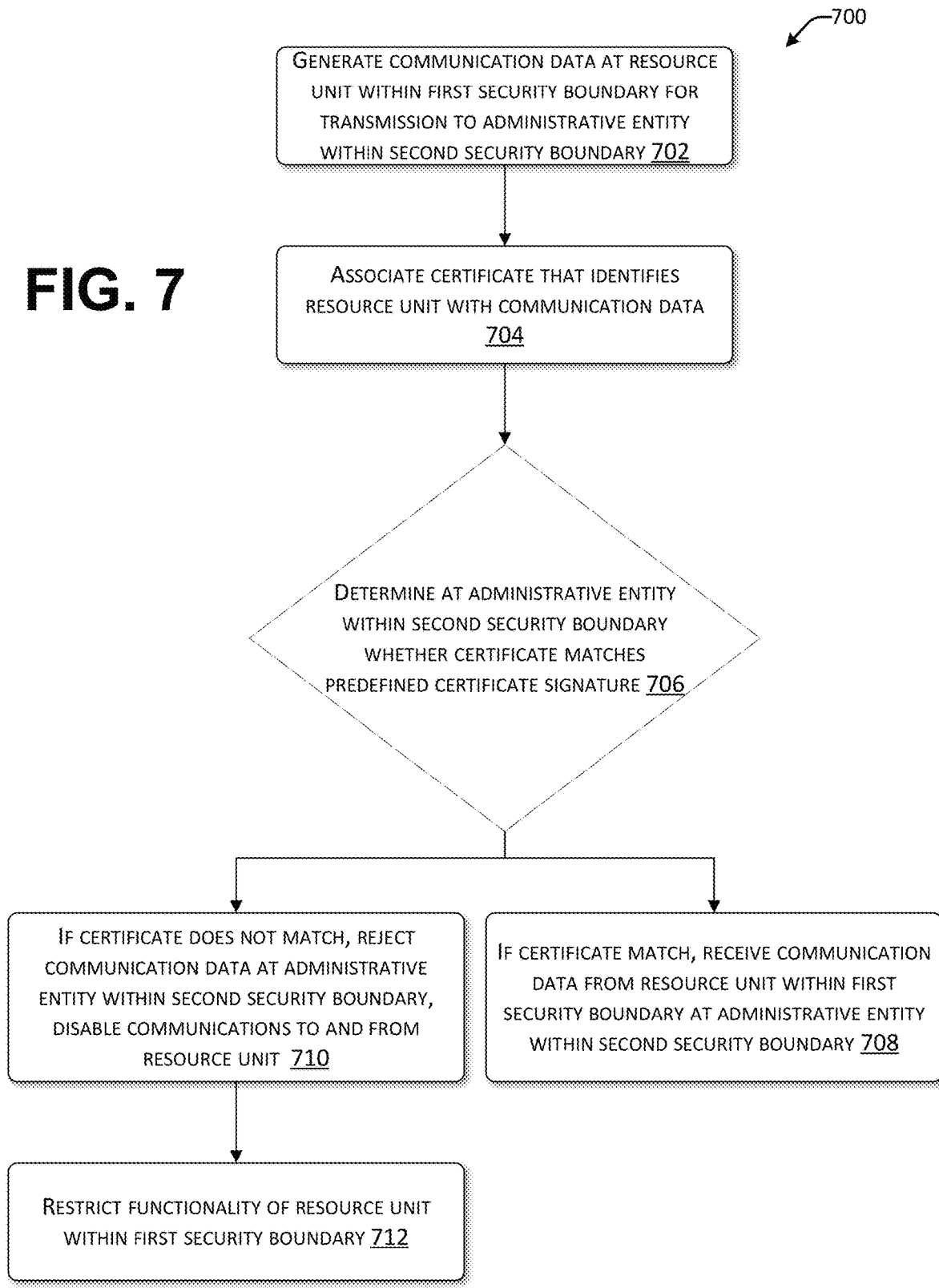
FIG. 7 is a flow diagram of an example routine for transmitting communication data using certificate-based authentication.

Turning now to FIGS. 6 and 7, aspects of routines for enabling job management and data communications through granular security boundaries and certificate-based authentication are shown and described. For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines 600 and 700 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 600 and 700 may be also implemented in many other ways. For example, the routines 600 and 700 may be implemented, at least in part, by a processor of another remote computer or a local circuit. In addition, one or more of the operations of the routines 600 and 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 6, routine 600 begins at operation 602 where a system receives a plurality of jobs having associated certificates at a job queue belonging to an administrative entity within a first security boundary. As discussed above, the administrative entity can be any component that manages farms and resource units.

Next at operation 604, the administrative entity selects a job from the job queue for execution at a destination resource unit within a second security boundary. The destination resource unit is specified by the individual job.

At operation 606, the administrative entity selects the destination resource unit from a plurality of resource units within the second security boundary.

Proceeding to operation 608, the destination resource unit determines whether the certificate associated with the individual job matches a predefined certificate signature.

If the received certificate does match the predefined certificate signature, the routine proceeds to operation 610 in which the administrative entity transmits the individual job from the first security boundary to the second security boundary.

Then, at operation 612, the destination resource unit within the second security boundary accepts and executes the individual job.

Alternatively, if the received certificate does not match the predefined certificate signature from operation 608, the routine proceeds to operation 614 wherein communication to and from the administrative entity is disabled (e.g., isolation within a security boundary). Furthermore, various functions of the administrative entity are restricted to basic known operations.

Proceeding now to FIG. 7, aspects of a routine 700 for transmitting communication using certificate-based authentication are shown and described. The routine 700 begins at operation 702 where a resource unit within a first security boundary generates communication data for transmission to an administrative entity within a second security boundary.

Proceeding to operation 704, the communication data is then associated with a certificate that identifies the resource unit that generated the communication data.

Then, at decision operation 706, the administrative entity within the second security boundary determines whether the certificate matches a predefined certificate signature.

In the event the certificate matches the predefined certificate signature, the routine 700 proceeds to operation 708 where the communication data is received by the administrative entity within the second security boundary.

Alternatively, if the certificate does not match the predefined certificate signature, the routine 700 proceeds to operation 710 where the communication data is rejected by the administrative entity within the second security boundary and communication to and from the resource unit within the first security boundary is disabled to isolate the resource unit.

Then, at operation 712, functionality of the resource unit that provided the non-matching certificate is restricted to prevent the spread of a potential compromise.

Figure 8:
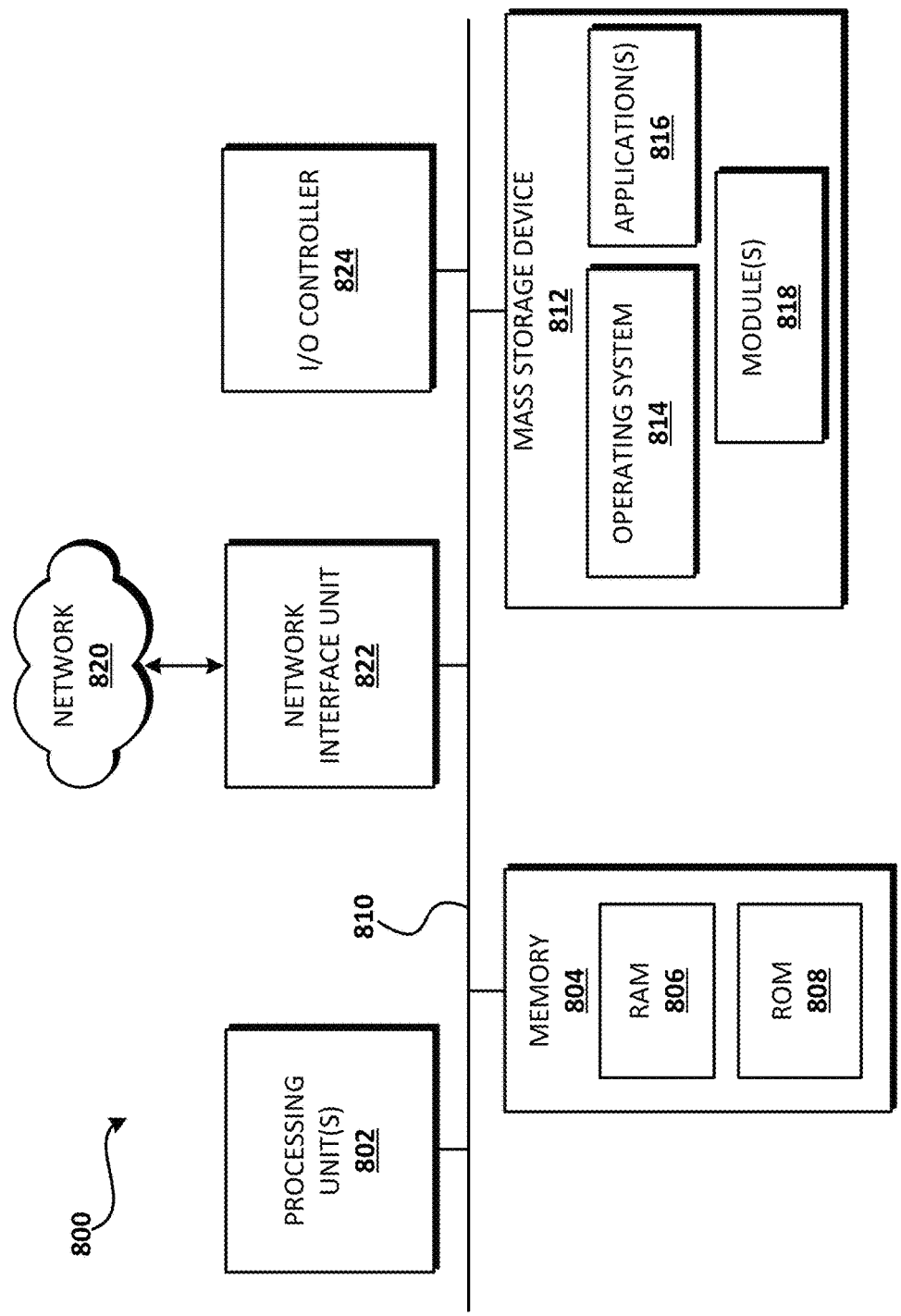
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a device, such as a computer or a server configured as part of the cloud-based platform or system 100, capable of executing computer instructions (e.g., a module or a program component described herein). The computer architecture 800 illustrated in FIG. 8 includes processing unit(s) 802, a system memory 804, including a random-access memory 806 ("RAM") and a read-only memory ("ROM") 808, and a system bus 810 that couples the memory 804 to the processing unit(s) 802.

Processing unit(s), such as processing unit(s) 802, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816, modules 818, and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 820. The computer architecture 800 may connect to the network 820 through a network interface unit 822 connected to the bus 810. The computer architecture 800 also may include an input/output controller 824 for receiving and processing input from a number of other devices, including a keyboard, mouse, touch, or electronic stylus or pen. Similarly, the input/output controller 824 may provide output to a display screen, a printer, or other type of output device.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit(s) 802.

Figure 9:
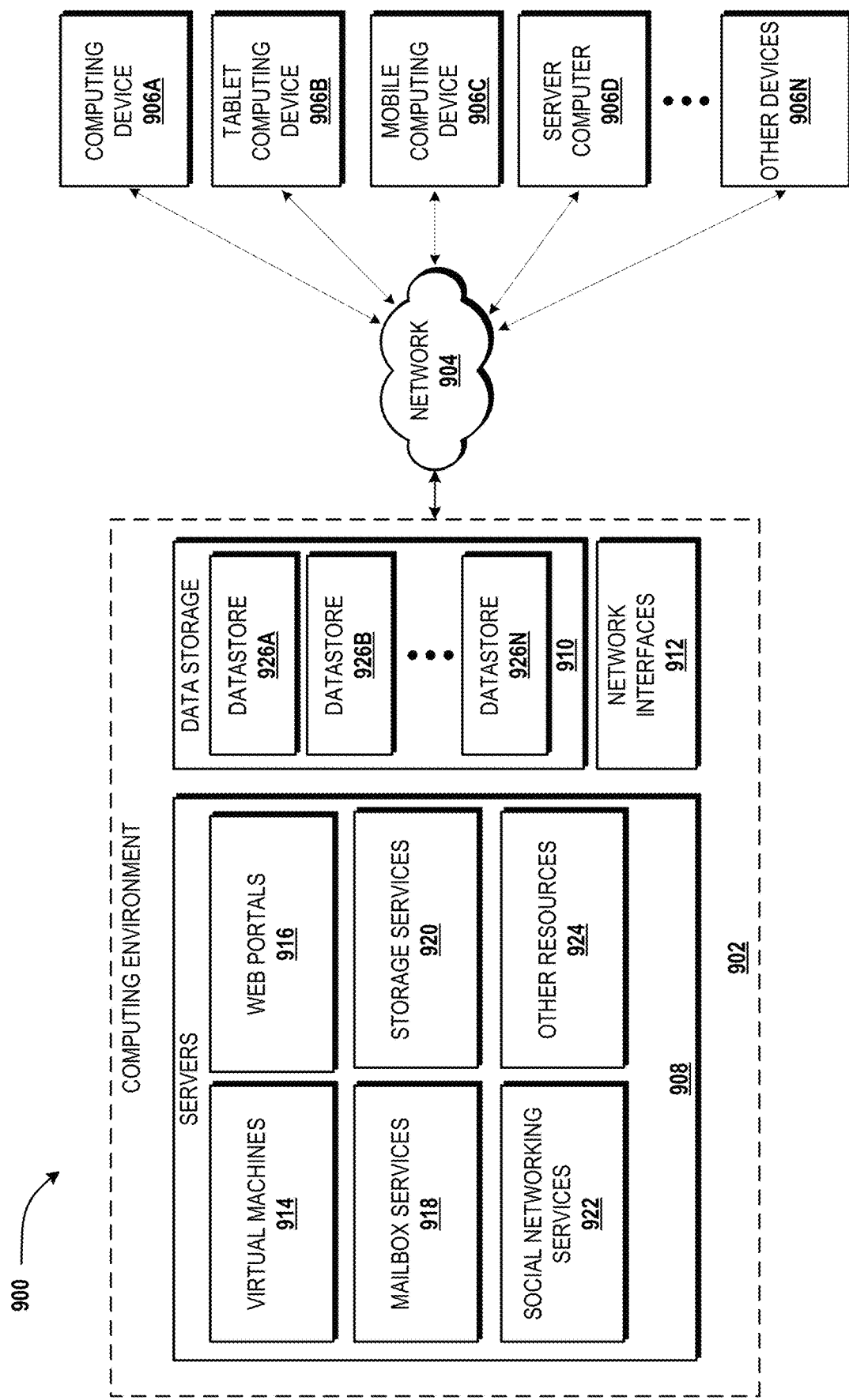
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

Accordingly, the distributed computing environment 900 can include a computing environment 902 operating on, in communication with, or as part of the network 904. The network 904 can include various access networks. One or more client devices 906A-906N (hereinafter referred to collectively and/or generically as "clients 906" and also referred to herein as computing devices 906) can communicate with the computing environment 902 via the network 904. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902.

In various examples, the computing environment 902 includes servers 908, data storage 910, and one or more network interfaces 912. The servers 908 can host various services, virtual machines, portals, and/or other resources. In the illustrated configuration, the servers 908 host virtual machines 914, Web portals 916, mailbox services 918, storage services 920, and/or, social networking services 922. As shown in FIG. 9 the servers 908 also can host other services, applications, portals, and/or other resources ("other resources") 924.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more servers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the servers 808 and/or other data. That is, the datastores 926 also can host or store web page documents, word documents, presentation documents, data structures, algorithms for execution by a recommendation engine, and/or other data utilized by any application program. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

The disclosure presented herein also encompasses the subject matter set forth in the following clauses.

Example Clause A, a method comprising: receiving a plurality of jobs within a first security boundary comprising an administrative entity and a job queue, wherein each job of the plurality of jobs is associated with a certificate that identifies a user account; selecting an individual job from the plurality of jobs at the job queue for execution within a second security boundary comprising a plurality of resource units, wherein the individual job defines a destination resource unit at the second security boundary; selecting the destination resource unit from the plurality of resource units within the second security boundary; determining that the certificate associated with the individual job matches a predefined certificate signature; in response to determining that the certificate associated with the individual job matches the predefined certificate signature, receiving the individual job from the administrative entity within the first security boundary at the destination resource unit within the second security boundary for execution; and executing, at the destination resource unit within the second security boundary, one or more functions defined by the individual job.

Example Clause B, the method of Example Clause A, wherein the administrative entity comprises a plurality of job managers for selecting and transmitting each job of the plurality of jobs to the plurality of resource units within the second security boundary.

Example Clause C, the method Example Clause A or Example Clause B, wherein the second security boundary encompasses a farm comprising the plurality of resource units and a second certificate for facilitating communication between the farm and the administrative entity within the first security boundary.

Example Clause D, the method of any one of Example Clauses A through C, wherein the certificate further defines at least one of a resource unit identifier, a network identifier, a certificate type, or a function of the destination resource unit that is available to the user account identified by the certificate.

Example Clause E, the method of any one of Example Clauses A through D, wherein determining that the certificate associated with the individual job matches the predefined certificate signature enables the user account to access the one or more modes of functionality of the resource unit defined by the certificate.

Example Clause F, the method of any one of Example Clauses A through E, further comprising: determining that an expiration time of the certificate has elapsed; and refreshing the certificate by generating a new certificate having at least one of a changed resource unit identifier, a changed network identifier, or a changed certificate type.

Example Clause G, the method of any one of Example Clauses A through F, further comprising: generating communication data at a resource unit of the plurality of resource units within the second security boundary for transmission to the administrative entity within the first security boundary; associating a second certificate with the communication data that identifies the resource unit; determining, at the administrative entity within the first security boundary, that the second certificate does not match a second predefined certificate signature; and in response to determining that the second certificate does not match the second predefined certificate signature, disabling communication between the resource unit within the second security boundary and the administrative entity within the first security boundary.

Example Clause H, the method of any one of Example Clauses A through G, wherein determining that the certificate associated with the individual job matches the predefined certificate signature comprises determining, at the destination resource unit of the second security boundary, that at least one of a resource unit identifier, a network identifier, or a certificate type defined by the certificate matches a predefined resource unit identifier, a predefined network identifier, or a predefined certificate type.

Example Clause I, the method of any one of Example Clauses A through H, further comprising: determining that the certificate is compromised; in response to determining that the certificate is compromised: disabling communication between the administrative entity of the first security boundary and the destination resource unit within the second security boundary; restricting one or more modes of functionality of the administrative entity within the first security boundary; and generating a new certificate having at least one of a changed resource unit identifier, a changed network identifier, or a changed certificate type.

Example Clause J, a system comprising: one or more processing units; and a computer-readable medium having encoded thereon computer-readable instructions that when executed, cause the one or more processing units to: receive a plurality of jobs within a first security boundary comprising an administrative entity and a job queue, wherein each job of the plurality of jobs is associated with a certificate that identifies a user account; select an individual job from the plurality of jobs at the job queue for execution within a second security boundary comprising a plurality of resource units, wherein the individual job defines a destination resource unit at the second security boundary; select the destination resource unit from the plurality of resource units within the second security boundary; determine that the certificate associated with the individual job matches a predefined certificate signature; in response to determining that the certificate associated with the individual job matches the predefined certificate signature, receive the individual job from the administrative entity within the first security boundary at the destination resource unit within the second security boundary for execution; and execute, at the destination resource unit within the second security boundary, one or more functions defined by the individual job.

Example Clause K, the system of Example Clause J, wherein the computer-readable instructions further cause the one or more processing units to: generate communication data at a resource unit of the plurality of resource units within the second security boundary for transmission to the administrative entity within the first security boundary; associate a second certificate identifying the resource unit with the communication data; determining that the second certificate does not match a second predefined certificate signature; and in response to determining that the second certificate does not match the second predefined certificate signature, disabling communication between the resource unit within the second security boundary and the administrative entity within the first security boundary.

Example Clause L, the system of Example Clause J or Example K, wherein determining that the certificate associated with the individual job matches the predefined certificate signature comprises determining, at the destination resource unit within the second security boundary, that at least one of a resource unit identifier, a network identifier, or a certificate type defined by the certificate matches a predefined resource unit identifier, a predefined network identifier, or a predefined certificate type.

Example Clause M, the system of any one of Example Clauses J through L, wherein the computer-readable instructions further cause the one or more processing units to: determine that an expiration time of the certificate has elapsed; and refresh the certificate by generating a new certificate having at least one of a changed resource unit identifier, a changed network identifier, or a changed certificate type.

Example Clause N, the system of any one of Example Clauses J through M, wherein the computer-readable instructions further cause the one or more processing units to: determine that the certificate is compromised; in response to determining that the certificate is compromised: disable communication between administrative entity within the first security boundary and the destination resource unit within the second security boundary; restrict one or more modes of functionality of the administrative entity within the first security boundary; and generate a new certificate to replace the certificate having at least one of a changed resource unit identifier, a changed network identifier, or a changed certificate type.

Example Clause O, a system comprising: one or more processing units; and a computer-readable medium having encoded thereon computer-readable instructions that when executed, cause the one or more processing units to: generate communication data at a resource unit of a plurality of resource units within a first security boundary for transmission to an administrative entity within a second security boundary; associate a certificate with the communication data that identifies the resource unit; determine, at the administrative entity within the second security boundary, whether the certificate associated with the communication data matches a predefined certificate signature; and in an event the certificate associated with the communication data matches the predefined certificate signature, receive the communication data from the resource unit within the first security boundary at the administrative entity within the second security boundary.

Example Clause P, the system of Example Clause O, wherein the first security boundary encompasses a farm comprising the plurality of resource units and the administrative entity includes a second certificate for facilitating distribution of jobs to the farm.

Example Clause Q, the system of Example Clause O or Example Clause P, wherein the administrative entity within the second security boundary comprises a plurality of job managers that select and transmit a plurality of jobs to the plurality of resource units within the first security boundary.

Example Clause R, the system of any one of Example Clause O through Q, wherein the computer-readable instructions further cause the one or more processing units to: generate, at the resource unit of the plurality of resource units within the first security boundary, a second communication data for transmission to the administrative entity within the second security boundary at a later time; associate the certificate with the second communication data; determine, at the administrative entity within the second security boundary, whether the certificate associated with the second communication data matches the predefined certificate signature; in an event the certificate associated with the second communication data does not match the predefined certificate signature: reject the second communication data at the administrative entity within the second security boundary and; generate a new certificate to replace the certificate having at least one of a changed resource unit identifier, a changed network identifier, or a changed certificate type.

Example Clause S, the system of any one of Example Clause O through R, wherein the computer-readable instructions further cause the one or more processing units to: determine that an expiration time of the certificate has elapsed; and refresh the certificate by generating a new certificate having at least one of a changed resource unit identifier, a changed network identifier, or a changed certificate type.

Example Clause T, the system of any one of Example Clause O through S, wherein the computer-readable instructions further cause the one or more processing units to: in an event the certificate associated with the communication data does not match the predefined certificate signature: disable communication between the resource unit within the first security boundary and the administrative entity within the second security boundary; and restrict one or more modes of functionality of the administrative entity within the second security boundary.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different certificates, two different security boundaries, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    receiving a plurality of jobs within a first security boundary comprising an administrative entity and a job queue, wherein each job of the plurality of jobs is associated with a first certificate that defines a client certificate type with first permissions;
    selecting an individual job from the plurality of jobs at the job queue for execution within a second security boundary comprising a plurality of resource units, wherein the individual job defines a destination resource unit within the second security boundary;
    selecting the destination resource unit from the plurality of resource units within the second security boundary;
    determining that the first certificate associated with the individual job matches a first predefined certificate signature;
    in response to determining that the first certificate matches the first predefined certificate signature, receiving the individual job from the administrative entity within the first security boundary at the destination resource unit within the second security boundary for execution;
    executing, at the destination resource unit within the second security boundary, one or more functions defined by the individual job;
    generating communication data at the destination resource unit within the second security boundary for transmission to the administrative entity within the first security boundary;
    associating a second certificate with the communication data, the second certificate defining a trusted root certificate type with second permissions that include elevated privileges compared to the first permissions;
    determining that the second certificate does not match a second predefined certificate signature indicating that the second certificate is associated with a compromise capable of spreading from the second security boundary to the first security boundary;
    in response to determining that the second certificate does not match the second predefined certificate signature indicating that the second certificate is associated with the compromise, disabling communication between the destination resource unit within the second security boundary and the administrative entity within the first security boundary to isolate the compromise; and
    configuring a validity flag of the trusted root certificate type to indicate that the second certificate is compromised thereby restricting the second permissions of the second certificate and preventing the compromise from spreading within the destination resource unit.

2. The method of claim 1, wherein the administrative entity comprises a plurality of job managers for selecting and transmitting each job of the plurality of jobs to the plurality of resource units within the second security boundary.

3. The method of claim 1, wherein a third security boundary encompasses a farm comprising a plurality of resource units and an uncompromised certificate for facilitating legitimate communication between the farm and the administrative entity within the first security boundary.

4. The method of claim 1, wherein an individual certificate identifies at least one of a resource unit identifier, a network identifier, a certificate type, a user account, or a function of the destination resource unit that is available to the user account.

5. The method of claim 1, wherein determining that the first certificate associated with the individual job matches the first predefined certificate signature enables access to one or more modes of functionality of the destination resource unit.

6. The method of claim 1, further comprising:
determining that an expiration time of the first certificate has elapsed; and
refreshing the first certificate by generating a new certificate having at least one of a changed resource unit identifier, a changed network identifier, or a changed certificate type.

7. The method of claim 1, wherein determining that the first certificate associated with the individual job matches the first predefined certificate signature comprises determining, at the destination resource unit within the second security boundary, that at least one of a resource unit identifier, a network identifier, or a certificate type defined by the first certificate matches a predefined resource unit identifier, a predefined network identifier, or a predefined certificate type.

8. The method of claim 1, further comprising generating a new certificate to replace the second certificate in response to determining that the second certificate does not match the second predefined certificate signature indicating that the second certificate is associated with the compromise, the new certificate having at least one of a changed resource unit identifier, a changed network identifier, or a changed certificate type.

9. A system comprising:
one or more processing units; and
a computer-readable medium having encoded thereon computer-readable instructions that when executed, cause the one or more processing units to:
receive a plurality of jobs within a first security boundary comprising an administrative entity and a job queue, wherein each job of the plurality of jobs is associated with a first certificate that defines a client certificate type with first permissions;
select an individual job from the plurality of jobs at the job queue for execution within a second security boundary comprising a plurality of resource units, wherein the individual job defines a destination resource unit at the second security boundary;
select the destination resource unit from the plurality of resource units within the second security boundary;
determine that the first certificate associated with the individual job matches a first predefined certificate signature;
in response to determining that the first certificate matches the first predefined certificate signature, receive the individual job from the administrative entity within the first security boundary at the destination resource unit within the second security boundary for execution;
execute, at the destination resource unit within the second security boundary, one or more functions defined by the individual job;
generate communication data at the destination resource unit within the second security boundary for transmission to the administrative entity within the first security boundary;
associate a second certificate with the communication data, the second certificate defining a trusted root certificate type with second permissions that include elevated privileges compared to the first permissions;
determine that the second certificate does not match a second predefined certificate signature indicating that the second certificate is associated with a compromise capable of spreading from the second security boundary to the first security boundary;
in response to determining that the second certificate does not match the second predefined certificate signature indicating that the second certificate is associated with the compromise, disable communication between the destination resource unit within the second security boundary and the administrative entity within the first security boundary to isolate the compromise;
reconfigure the trusted root certificate type to restrict the second permissions of the second certificate thereby preventing the compromise from spreading within the destination resource unit; and
generate a new certificate to replace the second certificate in response to determining that the second certificate does not match the second predefined certificate signature indicating that the second certificate is associated with the compromise, the new certificate having at least one of a changed resource unit identifier, a changed network identifier, or a changed certificate type.

10. The system of claim 9, wherein determining that the first certificate associated with the individual job matches the first predefined certificate signature comprises determining, at the destination resource unit within the second security boundary, that at least one of a resource unit identifier, a network identifier, or a certificate type defined by the first certificate matches a predefined resource unit identifier, a predefined network identifier, or a predefined certificate type.

11. The system of claim 9, wherein the computer-readable instructions further cause the one or more processing units to:
determine that an expiration time of the first certificate has elapsed; and
refresh the first certificate by generating a new certificate having at least one of a changed resource unit identifier, a changed network identifier, or a changed certificate type.

12. The system of claim 9, wherein reconfiguring the trusted root certificate type comprises configuring a validity flag of the second certificate to indicate that the second certificate is compromised.

13. A method comprising:
receiving a plurality of jobs within a first security boundary comprising an administrative entity and a job queue, wherein each job of the plurality of jobs is associated with a first certificate that defines a client certificate type with first permissions;
selecting an individual job from the plurality of jobs at the job queue for execution within a second security boundary comprising a plurality of resource units, wherein the individual job defines a destination resource unit within the second security boundary;
selecting the destination resource unit from the plurality of resource units within the second security boundary;
determining that the first certificate associated with the individual job matches a first predefined certificate signature;

in response to determining that the first certificate matches the first predefined certificate signature, receiving the individual job from the administrative entity within the first security boundary at the destination resource unit within the second security boundary for execution;

executing, at the destination resource unit within the second security boundary, one or more functions defined by the individual job;

generating communication data at the destination resource unit within the second security boundary for transmission to the administrative entity within the first security boundary;

associating a second certificate with the communication data, the second certificate defining a trusted root certificate type with second permissions that include elevated privileges compared to the first permissions;

determining that the second certificate does not match a second predefined certificate signature indicating that the second certificate is associated with a compromise capable of spreading from the second security boundary to the first security boundary;

in response to determining that the second certificate does not match the second predefined certificate signature indicating that the second certificate is associated with the compromise, disabling communication between the destination resource unit within the second security boundary and the administrative entity within the first security boundary to isolate the compromise;

reconfiguring the trusted root certificate type to restrict the second permissions of the second certificate thereby preventing the compromise from spreading within the destination resource unit; and generating a new certificate to replace the second certificate in response to determining that the second certificate does not match the second predefined certificate signature indicating that the second certificate is associated with the compromise, the new certificate having at least one of a changed resource unit identifier, a changed network identifier, or a changed certificate type.

14. The method of claim 13, wherein the administrative entity comprises a plurality of job managers for selecting and transmitting each job of the plurality of jobs to the plurality of resource units within the second security boundary.

15. The method of claim 13, wherein a third security boundary encompasses a farm comprising a plurality of resource units and an uncompromised certificate for facilitating legitimate communication between the farm and the administrative entity within the first security boundary.

16. The method of claim 13, wherein an individual certificate identifies at least one of a resource unit identifier, a network identifier, a certificate type, a user account, or a function of the destination resource unit that is available to the user account.

17. The method of claim 13, wherein determining that the first certificate associated with the individual job matches the first predefined certificate signature enables access to one or more modes of functionality of the destination resource unit.

18. The method of claim 13, further comprising:
determining that an expiration time of the first certificate has elapsed; and
refreshing the first certificate by generating a new certificate having at least one of a changed resource unit identifier, a changed network identifier, or a changed certificate type.

19. The method of claim 13, wherein determining that the first certificate associated with the individual job matches the first predefined certificate signature comprises determining, at the destination resource unit within the second security boundary, that at least one of a resource unit identifier, a network identifier, or a certificate type defined by the first certificate matches a predefined resource unit identifier, a predefined network identifier, or a predefined certificate type.

20. The method of claim 13, wherein reconfiguring the trusted root certificate type comprises configuring a validity flag of the second certificate to indicate that the second certificate is compromised.

* * * * *